United States Patent
Fichtner et al.

(10) Patent No.: US 9,303,565 B2
(45) Date of Patent: Apr. 5, 2016

(54) METHOD AND SYSTEM FOR OPERATING A TURBINE ENGINE

(75) Inventors: Edward C. Fichtner, San Diego, CA (US); Garrett C. Bolander, Coronado, CA (US); Chad M. Holcomb, San Diego, CA (US); Paul V. Smith, Houston, TX (US)

(73) Assignee: Solar Turbines Incorporated, San Diego, CA (US)

( * ) Notice: Subject to any disclaimer, the term of this patent is extended or adjusted under 35 U.S.C. 154(b) by 951 days.

(21) Appl. No.: 13/537,852

(22) Filed: Jun. 29, 2012

(65) Prior Publication Data

US 2014/0000272 A1 Jan. 2, 2014

(51) Int. Cl.
*F02C 9/00* (2006.01)
*F02C 9/20* (2006.01)

(52) U.S. Cl.
CPC ............... *F02C 9/20* (2013.01); *F05D 2260/80* (2013.01); *F05D 2270/304* (2013.01)

(58) Field of Classification Search
CPC .. F02C 9/20; F05D 2260/80; F05D 2270/304
USPC ............................................................ 60/773
See application file for complete search history.

(56) References Cited

U.S. PATENT DOCUMENTS

| | | | |
|---|---|---|---|
| 3,902,317 A | 9/1975 | Katsume et al. | |
| 4,368,616 A | 1/1983 | Abo et al. | |
| 4,370,560 A | 1/1983 | Faulkner et al. | |
| 2010/0005808 A1* | 1/2010 | Nanataki ................... | F02C 9/20 60/773 |
| 2010/0164234 A1 | 7/2010 | Bowman et al. | |
| 2011/0126547 A1 | 6/2011 | Nanataki et al. | |

* cited by examiner

*Primary Examiner* — Zelalem Eshete
(74) *Attorney, Agent, or Firm* — Finnegan, Henderson, Farabow, Garrett & Dunner, LLP

(57) ABSTRACT

A method and system for controlling a two-shaft turbine engine, the two-shaft turbine engine including a gas producer having a compressor with adjustable inlet guide vanes. The method includes monitoring a rotational speed of the gas producer, maintaining an inlet guide vane angle constant when a rotational speed of the gas producer is below a threshold value, and adjusting an inlet guide vane angle of the compressor at a predetermined rate when the rotational speed of the gas producer is above the threshold value.

18 Claims, 4 Drawing Sheets

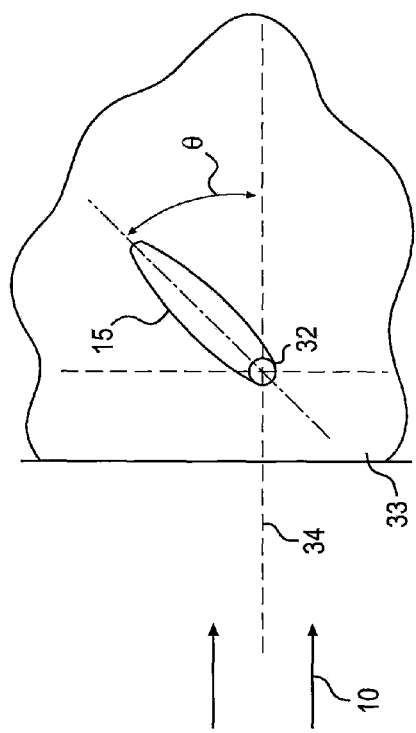
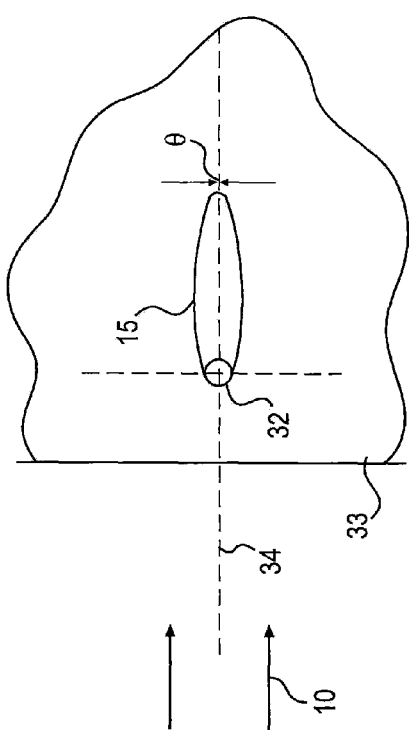
FIG. 2A
FIG. 2B

METHOD AND SYSTEM FOR OPERATING A TURBINE ENGINE

TECHNICAL FIELD

The present disclosure relates generally to a method and system for operating a turbine engine.

BACKGROUND

Turbine engine systems require careful design and control to provide satisfactory performance. In addition, governmental and industrial regulations impose limitations on turbine engine emissions. As a result, the operational parameters of turbine engine systems are closely monitored and controlled to meet the regulatory requirements.

U.S. Application Publication No. 2011/0126547 A1 to Nanataki et al. discloses a twin-shaft gas turbine engine system configured to selectively operate in a first control mode and a second control mode. In the first control mode, an inlet guide vane angle in a compressor of the system is controlled in accordance with a corrected shaft rotation speed. The corrected shaft rotation speed is obtained by normalizing an actual shaft speed value with an atmospheric temperature value. In the second control mode, the inlet guide vane angle is controlled to maintain a constant gas generator shaft rotation speed. The first control mode is used to start, stop, and operate the turbine engine system under fixed or lower load conditions, while the second control mode is used under other operational conditions.

SUMMARY

Embodiments of the present disclosure are directed to a method and system for controlling a two-shaft turbine engine, the two-shaft turbine engine including a gas producer having a compressor with adjustable inlet guide vanes. The method includes monitoring a rotational speed of the gas producer, maintaining an inlet guide vane angle constant when a rotational speed of the gas producer is below a threshold value, and adjusting an inlet guide vane angle of the compressor at a predetermined rate when the rotational speed of the gas producer is above the threshold value.

In further embodiments, this disclosure includes a method for controlling a two-shaft turbine engine, the two-shaft turbine engine including a gas producer having a compressor with adjustable inlet guide vanes. The method includes monitoring a rotational speed of the gas producer, maintaining an inlet guide vane angle constant when a rotational speed of the gas producer is below a threshold value, and adjusting an inlet guide vane angle of the compressor when the rotational speed of the gas producer is above the threshold value, the adjustment being independent of sensed temperatures associated with the engine.

In yet further embodiments, this disclosure includes a control system for controlling a two-shaft turbine engine, the two-shaft turbine engine including a gas producer having a compressor. The control system includes a speed sensor configured to measure a rotational speed of the gas producer and generate an electronic signal representing the rotational speed of the gas producer, a controller configured to receive the electronic signal from the speed sensor and determine an inlet guide vane angle for the compressor in response to the rotational speed of the gas producer, the inlet guide vane angle determined based on a predetermined rate, and the controller generating a control signal indicating the inlet guide vane angle, and an actuator configured to receive the control signal from the controller and adjust the inlet guide vane angle in response to the control signal.

BRIEF DESCRIPTION OF THE DRAWINGS

FIGS. 2A and 2B illustrate an exemplary disclosed inlet guide vane positioned at different inlet guide vane angles;

DETAILED DESCRIPTION

Figure 1:
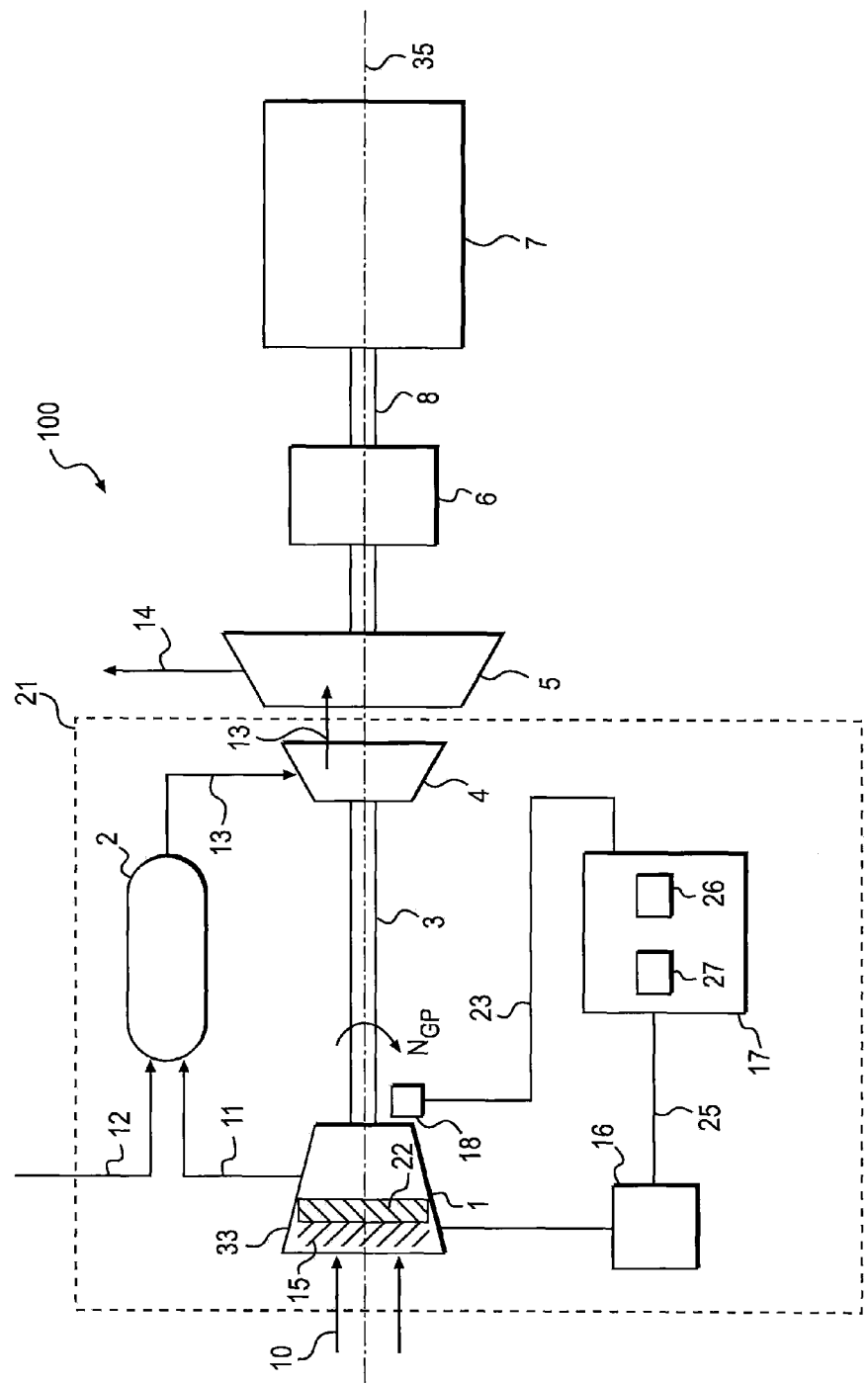
FIG. 1 is a schematic diagram of an exemplary disclosed two-shaft turbine system.

FIG. 1 depicts an exemplary disclosed two-shaft turbine system 100 including a gas producer 21 and a power turbine 5. Gas producer 21 is mechanically decoupled from power turbine 5 and generates a high-temperature, high-pressure gas flow 13 to drive power turbine 5. Turbine 5 may be coupled to a load 7 through a gear box 6. Load 7 may be any mechanical or industrial systems that consume mechanical power provided by turbine 5. For example, load 7 can be an electrical generator, a compressor, and/or a pump.

Gas producer 21 includes a compressor 1, a combustor 2, and a turbine 4. Compressor 1 compresses an incoming gas flow 10 and provides a compressed gas flow 11 to combustor 2. Compressor 1 may receive incoming gas flow 10 from a surrounding environment. As such, incoming gas flow 10 may carry air under ambient conditions, such ambient air temperature and atmospheric pressure. Alternatively, compressor 1 may receive incoming gas flow 10 from a dedicated gas source such as a gas tank or a gas generator.

Combustor 2, also known as combustion chamber or burner, receives the compressed gas flow 11 from compressor 1 and receives fuel 12 from a fuel supply. Combustor 2 mixes the fuel and the compressed gas and heats the compressed gas by burning the fuel therein. The burning of the fuel adds energy to the compressed gas and increases the temperature of the gas flow. Combustor 2 then provides the high-temperature, high-pressure gas flow 13 to turbine 4. High-temperature, high-pressure gas flow 13 drives turbines 4 and 5 and exits turbine system 100 as a lower temperature, lower pressure gas flow 14. Turbine 4 is coupled with compressor 1 through a shaft 3. When driven by gas flow 13, turbine 4 rotates and drives compressor 1 through shaft 3.

Compressor 1 may be an axial compressor including a plurality of stages. Each stage includes rotational blades or airfoils driven by shaft 3 and stationary vanes mounted on a compressor casing. The stationary vanes guide the incoming gas flow onto the blades, while the shaft drives the rotational blades to move the gas in an axial direction to a next stage where the gas is further compressed. Compressor 1 may include a set of inlet guide vanes 15 mounted on the compressor casing in front of the first stage of compressor 1. Inlet guide vanes 15 direct incoming gas flow 10 onto a set of first-stage blades 22. First-stage blades 22 are driven by shaft 3 and move incoming gas flow 10 to the subsequent stages.

FIGS. 2A and 2B depict an exemplary disclosed inlet guide vane 15 of FIG. 1. It is understood that the inlet guide vane 15 is coupled to a plurality of additional guide vanes 15 arranged circumferentially about the first stage of compressor 1 so that the guide vanes 15 are moved in unison to a desired position.

Further, these guide vanes 15 may also be connected to a plurality of guide vanes 15 of a plurality of additional downstream stages. Thus, positioning guide vanes 15 at different angles may include positioning guide vanes 15 of additional stages at the same angle in unison.

Inlet guide vanes 15 are mounted on compressor casing 33 through mounting shafts 32 and may be rotated on shaft 32. Inlet guide vanes 15 form an inlet guide vane (IGV) angle θ with a line 34, which is parallel with a center line 35 of shaft 3 (FIG. 1). IGV angle θ may be varied by rotating inlet guide vanes 15 on shafts 32. For example, a negative value is achieved for IGV angle θ when inlet guide vanes 15 are rotated counterclockwise from line 34, as shown in FIG. 2A, while a positive value is achieved for angle θ when inlet guide vanes 15 are rotated clockwise from line 34. When inlet guide vanes 15 are positioned along line 34, as shown in FIG. 2B, IGV angle θ is zero degrees. One skilled in the art will appreciate that the reference position of IGV angle θ is for illustrative purpose only and other reference positions could be used.

By positioning inlet guide vanes 15 at different angles, incoming air flow 10 may be directed in different directions onto rotational blades 22 of the first stage of compressor 1, thereby controlling operational characteristics of turbine system 100, such as the power output to load equipment 7.

According to one embodiment, IGV angle θ may be controlled based on operational parameters collected from turbine system 100. Referring back to FIG. 1, for example, inlet guide vanes 15 may be adjusted based on a mechanical speed or a rotational speed N of compressor 1. For example, inlet guide vanes 15 may be controlled by a controller 17 through an actuator 16. Actuator 16 may be a step motor operated by electrical power, a hydraulic or pneumatic device, a helical gear assembly, or other proper electrical and/or mechanical actuation mechanisms. Actuator 16 operates inlet guide vanes 15 through push rods or other electrical or mechanical or fluid couplings. Actuator 16 has the capability to rotate inlet guide vanes 15 in a continuous manner to adjust IGV angle θ continuously and to hold inlet guide vanes 15 to maintain IGV angle θ.

Controller 17 includes an electronic control circuit having a central processing unit (CPU) 26, such as any known processor, or micro controller. Alternatively, controller 17 may be a programmable logic controller, a field-programmable gate array, etc. Controller 17 further includes a memory 27 for storing computer executable instructions, which may be executed by CPU 26 to control inlet guide vanes 15 according to control methods described herein. The computer executable instructions may be written in known computer programming languages, such as C, C++, BASIC, FORTRAN, or other general or proprietary computer programming languages. Memory 27 further stores control data related to the controlling of inlet guide vanes 15. The control methods and control data will be further described below.

Controller 17 may receive input signals from one or more sensors attached to turbine system 100. Specifically, the sensors may include a speed sensor 18 for sensing the rotational speed N of shaft 3. Speed sensor 18 may include an electromagnetic component, which senses the rotation of shaft 3 and generates electronic signal 23 representing the rotational speed N. The rotational speed N may be measured from shaft 3 or other components mounted on shaft 3. Alternatively, other types of sensors can be used to determine the speed of shaft 3, including, for example, a virtual speed sensor arrangement. Speed sensor 18 transmits signal 23 to controller 17, which generates a control signal 25 based on signal 23 by executing the instructions stored in the memory. The control signal 25 is received by actuator 16 and instructs actuator 16 to operate inlet guide vanes 15, thereby varying IGV angle θ. It is understood, reference to rotational speed N of the shaft 3 can be referred to as a rotational speed of the compressor 1 or the rotational speed of the gas producer 21, and such references are used synonymously herein.

Figure 3:
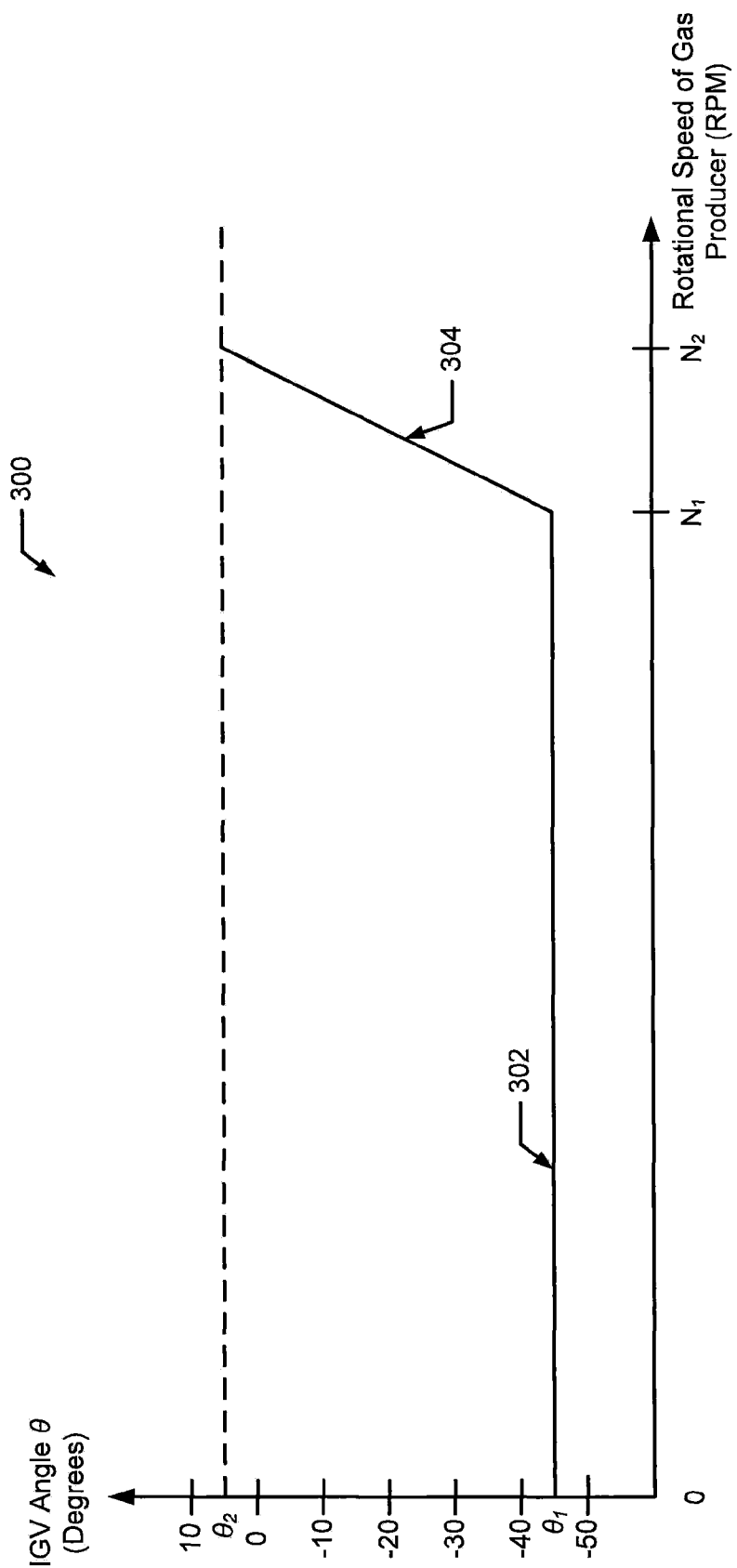
FIG. 3 illustrates an exemplary disclosed control map for controlling the inlet guide vane angles of the turbine system of FIG. 1.

FIG. 3 depicts an exemplary disclosed control map 300 that controller 17 uses to generate control signal 25 for adjusting IGV angle θ. Control map 300 may be stored in memory 27 as a look-up table or in an equation form. Specifically, control map 300 defines a functional relationship between IGV angle θ in, for example, degrees and the rotational speed N of gas producer 21 in, for example, revolutions per minute. The rotational speed N of gas producer 21 is provided through, for example, signal 23 generated by speed sensor 18 of FIG. 1. According to one embodiment, as shown in FIG. 3, the rotational speed N of gas producer 21 may vary from 0 to $N_2$. The value of $N_2$ may correspond to 100% of the rated speed of the gas producer 21. Wherein the rated speed corresponds to a predetermined speed value indicating an allowable maximum speed for continuous reliable performance, and may be determined according to system designs or mechanical limitations.

Based on the rotational speed N, controller 17 may generate control signal 25 to set IGV angle θ according to control map 300. According to one embodiment, control map 300 is divided into two sections 302 and 304 based on a threshold speed value $N_1$. Each section defines a different characteristic of IGV angle θ in response to the rotational speed N of compressor 1. As a result, controller 17 generates signal 25 based on the rotational speed N and according to section 302 or 304 of control map 300. According to one exemplary embodiment, $N_1$ is substantially equal to 9,500 rpm, and $N_2$ is substantially equal to 10,000 rpm. However, it is understood that different values may be used for $N_1$ and $N_2$. The use of the terms "approximately," "essentially," or "substantially" in the detailed description and claims is intended to allow for slight variations in the associated Numerical value or condition. Such slight variations are understood to be in the range of ±3%.

During the operation of turbine system 100, controller 17 monitors the rotational speed N of compressor 1 through signal 23 received from speed sensor 18. When determining that the rotational speed N is less than $N_1$, controller 17 may generate control signal 25 according to section 302 of control map 300. Section 302 of control map 300 includes a substantially horizontal line indicating that IGV angle θ remains unchanged as the rotational speed N increases or decreases. Thus, controller 17 may instruct actuator 16 to maintain inlet guide vanes 15 at an IGV angle θ at a value of $θ_1$. According to a one embodiment, the fixed value of $θ_1$ for IGV angle θ defined in section 302 may be set between −40 degrees to −50 degrees and is depicted in FIG. 2A. At this angle, inlet guide vanes 15 would be considered effectively closed. As understood, the phrase "effectively closed" refers to a maximum flow reduction IGV angle θ of the inlet guide vanes 15, however, such a position does not correspond to closing the inlet of the compressor to air flow, but rather still allows for intake and compression of air by compressor 1.

When the rotational speed N is greater than $N_1$, controller 17 may generate control signal 25 to set IGV angle θ according to section 304 of control map 300. Control map 300, and in particular, section 304 indicates predetermined rate of adjustment of control IGV angle θ based on rotational speed N. As understood, the phrase "predetermined rate" used herein corresponds to a rate that is stored in memory 27 and does not vary based on other sensed parameters associated with the gas producer, such as sensed temperature or pressure values obtained during operation of the gas producer 21. As noted above, this predetermined rate can be stored as a look-up table or in an equation form. For example the predetermined rate may be a linear relationship between IGV angle θ and the rotational speed N. According to section 304, IGV angle θ increases in proportion to the rotational speed N. As a result, controller 17 instructs actuator 16 to rotate inlet guide vanes 15 so as to increase IGV angle θ from the effectively closed position to a more open position according to the rotational speed N. As stated herein, movement of the inlet guide vanes 15 toward zero degrees (the fully open position) from the effectively closed position corresponds to "increasing" the IGV angle θ. For example, when the rotational speed N is greater than $N_1$, controller 17 instructs actuator 16 to increase IGV angle θ from $\theta_1$ until the rotational speed N reaches $N_2$. When the rotation speed N reaches $N_2$, controller 17 sets IGV angle θ to $\theta_2$. According one embodiment, $\theta_2$ is between 0 degrees and 10 degrees. At the value of $\theta_2$ for IGV angle θ, the inlet of compressor 1 is essentially fully open to receive incoming gas flow 10 as shown in FIG. 2B. As a result, within section 304, controller 17 operates inlet guide vanes 15 from an essentially fully closed to an essentially fully open position within a window of the rotational speed N that is substantially equal to $N_2-N_1$.

When the rotational speed N reaches the threshold speed $N_1$, controller 17 increases IGV angle θ according to section 304 of control map 300 at a rate substantially equal to $(\theta_2-\theta_1)/(N_2-N_1)$. According to one embodiment, the predetermined rate at which controller 17 changes IGV angle θ is substantially constant and equal to 0.1 degree per rpm. For example, when the rotational speed N increases or decreases by 1 rpm, controller 17 instructs actuator 16 to increase IGV angle θ by 0.1 degree. Similarly, controller 17 may instruct actuator 16 to increase IGV angle θ by 1 degree, when the rotational speed N increases by 10 rpm. Controller 17 may respond to lesser or greater changes in the rotational speed N and increase IGV angle θ accordingly at the same rate.

One skilled in the art will appreciate that the above-discussed values for $\theta_1$, $\theta_2$, $N_1$, and $N_2$ are intended for illustrative purposes only. Different values may be used according to particular system designs and performance requirements. For example, controller 17 may start to increase IGV angle θ when the rotation speed N reaches 9,000 rpm. Alternatively, controller 17 may start to increase IGV angle θ when the rotational speed N reaches 9,800 rpm. According to still another embodiment, controller 17 may increase IGV angle θ at a rate less or greater than 0.1 degree per rpm. For example, controller 17 may increase the IGV angle θ at a rate equal to 0.2 degree per rpm or 0.05 degree per rpm. Still alternatively, the window of the rotational speed N for adjusting IGV angle θ may be less or greater than 500 rpm. For example, controller 17 may rotate inlet guide vanes 15 from fully closed to fully open within a window of 600 rpm or 400 rpm. Still alternatively, the range of the value for IGV angle θ may be less or greater than 50 degrees. For example, $\theta_1$ may be −60 degrees, and $\theta_2$ may be 20 degrees. As such, IGV angle may be adjusted within a range of 80 degrees. Still further, adjustment of IGV angle θ from fully closed to fully open may be scheduled to take place at substantially 100% of the rated maximum rotational speed N of the compressor 1 gas producer 21. This would serve to maintain 100% speed N down to a low load operation.

INDUSTRIAL APPLICABILITY

The above-described inlet guide vane control system and control map can be applied to any two-shaft turbine engine system, which includes a gas producer for generating a high-pressure, high-temperature gas flow to drive a power turbine.

As discussed above, the gas producer 21 and the power turbine 5 have separate shafts drivingly coupled through the high-pressure, high-temperature gas flow. A load 7 is coupled to the power turbine 5 and applies an external load to the power turbine 5. The gas producer 21 has a compressor 1 for receiving an incoming gas flow and providing compressed gas to a combustor 2, which generates the high-pressure, high-temperature gas flow. The compressor 1 has inlet guide vanes 15 controlled by a controller 17 through an actuator 16. An IGV angle θ described above may be controlled by rotating the inlet guide vanes 15 of the compressor 1.

Figure 4:
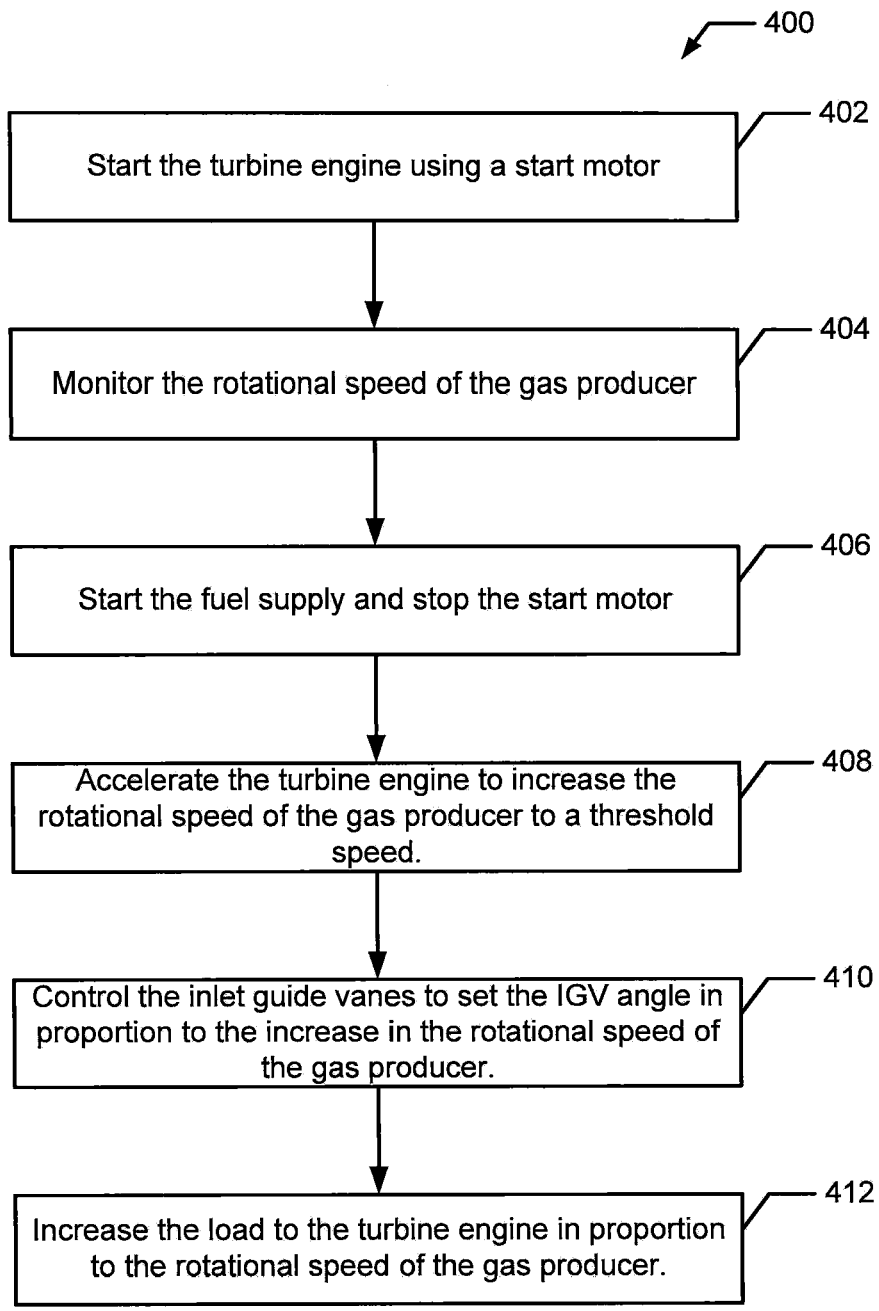
FIG. 4 illustrates an exemplary disclosed process for controlling the inlet guide vane angles of the turbine system of FIG. 1.

FIG. 4 illustrates a flow diagram of an exemplary control process 400 for controlling a two-shaft turbine engine system using the above-described control system. According to FIG. 4, at step 402, the gas producing system 21 is started with the assistance of a starter motor (not shown). The starter motor is coupled to the shaft of the gas producer 21 and drives the gas producer 21 during start-up. The starter motor may be an electric motor or an IC engine.

During start-up, the controller 17 instructs the actuator to position the inlet guide vanes of the compressor according to section 302 of control map 300 depicted in FIG. 3. Specifically, the controller generates a control signal to instruct the actuator to position the inlet guide vanes at an IGV angle equal to $\theta_1$ defined in control map 300. According one embodiment, $\theta_1$ is between −40 to −50 degrees so that the inlet guide vanes are essentially closed to limit the incoming gas flow.

At step 404, a rotational speed of the gas producer 21 is monitored. As noted above, the rotational speed may be determined from a rotational shaft 3 of the gas producer 21. The rotational speed may be measured by a speed sensor 18 as described above, which generates an electronic signal 23 and transmits the same to the controller 17.

At step 406, a fuel supply 12 is provided to the gas producer 21. The fuel supply 12 is injected into the combustor 2 of the gas producer 21 and mixed with the compressed gas therein. The combustor produces the high-pressure, high-temperature gas flow 13 by burning the fuel-gas mixture. When the turbine system is accelerated to a particular speed, at which the power produced by the gas producer 21 is able to sustain the rotation of the turbine system, the starter motor is stopped or disengaged.

At step 408, the gas producer 21 is accelerated to increase the rotational speed of the shaft 3 of the gas producer 21. The rotational speed N is monitored to determine whether it reaches a threshold speed. The threshold speed may be determined based on system design and/or experimental results. According to one embodiment, the threshold speed is equal to $N_1$ described above in connection with FIG. 3.

At step 410, when the rotational speed N of the gas producer reaches the threshold speed $N_1$, the inlet guide vanes 15 of the compressor 1 are rotated to set the IGV angle θ according to section 304 of control map 300 depicted in FIG. 3. In particular, the controller 17 receives a signal from the speed sensor 18 indicating the rotational speed N of the gas producer 21 and determines a proper value for the IGV angle θ based on the rotational speed N and the control map.

According to one embodiment, the controller 17 determines the proper value for the IGV angle θ by a linear interpolation within section 304 of control map 300. For example, the proper value corresponding to the rotational speed of the gas producer can be determined according to the following interpolation formula:

$$\theta = \theta_1 + \theta_2 \frac{N - N_1}{N_2 - N_1}$$

where $\theta_1$, $\theta_2$, $N_1$, and $N_2$ are defined in control map 300 of FIG. 3, N represents the rotational speed of the gas producer 21 measured by the speed sensor 18, and $\theta$ represents the proper IGV angle corresponding to the rotational speed N of the gas producer. A plurality of values for the IGV angle are pre-determined for various rotational speeds between $N_1$ and $N_2$ according to the above formula and stored in a look-up table in the controller 17. When the controller 17 determines the rotational speed N of the gas producer is between $N_1$ and $N_2$, the controller 17 searches the look-up table and determines a proper IGV angle $\theta$ corresponding to the rotational speed N.

Based on the proper IGV angle $\theta$ determined as described above, the controller generates a control signal 25 and transmits the control signal 25 to the actuator 16 to rotate the inlet guide vanes 15 to the proper IGV angle $\theta$. In addition, when the rotational speed N of the gas producer 21 increases or decreases, the controller 17 controls the actuator 16 to change the IGV angle $\theta$ accordingly. In particular, when the rotational speed N increases, the controller instructs the actuator 16 to increase the IGV angle $\theta$ at a rate substantially equal to $(\theta_2-\theta_1)/(N_2-N_1)$. When the rotational speed N decreases, the controller instructs the actuator to decrease the IGV angle $\theta$ at a rate substantially equal to $(\theta_2-\theta_1)/(N_2-N_1)$.

At step 412, when the rotational speed N of the gas producer 21 reaches the threshold speed $N_1$ an external load is applied to the turbine engine system through the power turbine 5. Because of the linear relationship between the IGV angle $\theta$ and the rotational speed N of the gas producer 21 in section 304 of control map 300, the external load 7 and the rotational speed N also form a substantially linear relationship. Specifically, when the controller 17 starts to increase the IGV angle $\theta$ by rotating the inlet guide vanes 15, the external load 7 is increased in proportion to the increase in the rotational speed N of the gas producer 21 or the changes in IGV angle $\theta$. As a result, the external load 7 applied to the power turbine 5 has a linear relationship with the rotational speed N. The external 17 load applied to the power turbine 5 is substantially zero when the rotational speed N of the gas producer is less than or equal to $N_1$ defined in control map 300. When the rotational speed N of the gas producer 21 reaches $N_2$ defined in control map 300, the external load 7 reaches a maximum value. When the rotational speed increases or decreases between $N_1$ and $N_2$, the external load 7 increases or decreases as an approximately linear function of the rotational speed N.

The control system and method described above provides simplified control logic to a two-shaft turbine engine system 100. Specifically, the control system described herein removes a non-linear relationship between the IGV angle $\theta$ and the rotational speed N of the gas producer 21. As a result, the control system provides a linear relationship between the IGV angle $\theta$ and the rotational speed N of the gas producer 21 and between the external load 7 and the rotational speed N of the gas producer 21. The linear relationship allows a more consistent control of output power in the operation of the two-shaft turbine engine system 100.

For example, when a pollution-prevention process is implemented on a two-shaft turbine engine, the control system and method described herein may allow more accurate control of the pollution-prevention process. In particular, some pollution-prevention processes involve a lean combustion technique to provide a more uniform gas-fuel mixture, and one benefited by a more accurate and precise control of the IGV angle to prevent undesirable emissions. The pollution-prevention process further requires adjusting the IGV angle $\theta$ in accordance with the power produced by the gas producer 21 to drive the load 7. In the two-shaft turbine engine, however, the external load 7 or the power used to drive the load 7 is unavailable or difficult to determine. As a result, the rotational speed of the gas producer 21 is used in place of the external load for controlling the IGV angle.

The present control systems, which produces a linear relationship between the rotational speed N of the gas producer 21 and the external load 7 avoids the need for a measurement of ambient temperature of the incoming gas flow to compensate for the temperature effect on the relationship. Thus, the linear relationship provided by the disclosed system and method is independent of sensed temperatures associated with the engine such as the ambient temperature of the incoming gas flow into compressor 1. Such a system avoids inaccuracies associated with temperature measurement and temperature compensation.

In addition, the disclosed control system provides a more accurate and simplified triggering of the pollution-prevention process during operation of the turbine engine system 100. In order to assist in stable operation of the turbine engine system, the pollution-prevention process is triggered at a predetermined external load. The disclosed control system provides an accurate and consistent triggering point that is substantially close to the predetermined external load, thereby providing a sufficient safety margin to ensure the turbine engine system 100 operates in a stable manner to take advantage of the lean combustion condition provided by the pollution-prevention process. For example, a desired triggering point of the pollution-prevention process may be set at 50% of the maximum external load. Because of the linear relationship between the external load 7 and the rotational speed N provided by the disclosed control system, the rotational speed of $(N_1+N_2)/2$ may be used as an accurate approximation of the 50% of the maximum external load. In general, if a desired triggering point of the pollution-prevention process is set to be p percent of the maximum external load, the corresponding rotational speed of $p(N_1+N_2)/100$ may be used as an accurate approximation to the desired triggering point.

Furthermore, the disclosed control system increases or decreases the IGV angle $\theta$ in response to the rotational speed N of the gas producer at a predetermined rate, thereby allowing an easier and more precise control of the speed range in which the external load 7 is applied. For example, the disclosed control system may increase the IGV angle $\theta$ in response to the rotational speed N at a rate equal to 0.1 degree per rpm. As a result, the inlet guide vanes 15 of the compressor are operated from fully closed to fully open within 500 rpm. Thus, the control system operates the turbine engine 100 to vary the output power continuously and linearly within a relative narrow range of the rotational speed N, thereby reducing wear and tear of engine components.

According to a further embodiment, the threshold rotational speed (e.g., $N_1$ of FIG. 3) at which the external load 7 is applied to the power turbine 100 can be set relatively high, e.g., 95% of a rated maximum rotational speed of the gas producer. As a result, the turbine engine system produces output power in a range that is far away from a mechanical resonance or critical exciting speed, thereby reducing undesired engine vibration.

It will be apparent to those skilled in the art that various modifications and variations can be made to the disclosed control system. Other embodiments will be apparent to those skilled in the art from consideration of the specification and practice of the disclosed control system. It is intended that the specification and examples be considered as exemplary only, with a true scope being indicated by the following claims and their equivalents.

What is claimed is:

1. A method for controlling a two-shaft turbine engine, the two-shaft turbine engine including a gas producer having a compressor with adjustable inlet guide vanes, the method comprising:
monitoring a rotational speed of the gas producer;
maintaining an inlet guide vane angle constant when a rotational speed of the gas producer is below a threshold value; and
adjusting an inlet guide vane angle of the compressor at a predetermined rate when the rotational speed of the gas producer is above the threshold value, wherein the adjustment of the inlet guide vane angle is independent of sensed temperatures associated with the engine.

2. The method of claim 1, wherein the threshold value is greater than or equal to approximately 95% of a rated speed of the gas producer.

3. The method of claim 1, wherein the adjusting of the inlet guide vane angle includes adjustment according to a stored control map relating inlet guide vane angle with rotational speed of the gas producer.

4. The method of claim 1, further comprising:
applying an external load to the two-shaft turbine engine when the rotational speed of the gas producer reaches the threshold value.

5. The method of claim 4, wherein the external load is adjusted in a linear manner with respect to changes in the rotational speed of the gas producer.

6. The method of claim 1, wherein the predetermined rate is linear with respect to changes in the rotational speed of the gas producer.

7. The method of claim 1, wherein the adjustment of the guide vane angle is provided over a speed range of less than approximately 500 revolutions per minute of the gas producer.

8. The method of claim 1, wherein the predetermined rate is substantially equal to 0.1 degree per revolutions per minute.

9. The method of claim 1, wherein the threshold value is substantially equal to 100% of a rated speed of the gas producer.

10. A method for controlling a two-shaft turbine engine, the two-shaft turbine engine including a gas producer having a compressor with adjustable inlet guide vanes, the method comprising:
monitoring a rotational speed of the gas producer;
maintaining an inlet guide vane angle constant when a rotational speed of the gas producer is below a threshold value;
adjusting an inlet guide vane angle of the compressor when the rotational speed of the gas producer is above the threshold value, the adjustment being independent of sensed temperatures associated with the engine.

11. The method of claim 10, wherein the threshold value is greater than or equal to approximately 95% of a rated speed of the gas producer.

12. The method of claim 10, wherein the adjusting of the inlet guide vane angle includes adjustment according to a stored control map relating inlet guide vane angle with rotational speed of the gas producer.

13. The method of claim 12, further comprising:
applying an external load to the two-shaft turbine engine when the rotational speed of the gas producer reaches the threshold value.

14. The method of claim 13, wherein the external load is adjusted in linear manner with respect to the rotational speed of the gas producer.

15. The method of claim 14, wherein the adjustment of the guide vane angle is provided over a speed range of less than approximately 500 revolutions per minute of the gas producer.

16. A control system for controlling a two-shaft turbine engine, the two-shaft turbine engine including a gas producer having a compressor, the control system comprising:
a speed sensor configured to measure a rotational speed of the gas producer and generate an electronic signal representing the rotational speed of the gas producer;
a controller configured to receive the electronic signal from the speed sensor and determine an inlet guide vane angle for the compressor in response to the rotational speed of the gas producer, the inlet guide vane angle determined based on a predetermined rate, and the controller generating a control signal indicating the inlet guide vane angle and adjusting the inlet guide vane angle independent of sensed temperatures associated with the engine; and
an actuator configured to receive the control signal from the controller and adjust the inlet guide vane angle in response to the control signal.

17. The system of claim 16, wherein the controller is further configured to determine whether the rotational speed of the gas producer reaches a threshold speed and, when the rotational speed of the gas producer reaches the threshold speed, instruct the actuator to increase the inlet guide vane angle of the compressor in proportion to the rotational speed of the gas producer.

18. The system of claim 17, wherein the controller is further configured to maintain the inlet guide vane angle at the first angle value before the rotational speed of the gas producer reaches the threshold speed.

* * * * *